June 17, 1969  K. K. KLATT  3,449,970
FINE AND COARSE ROTATION CONTROL DEVICE
Filed July 11, 1967
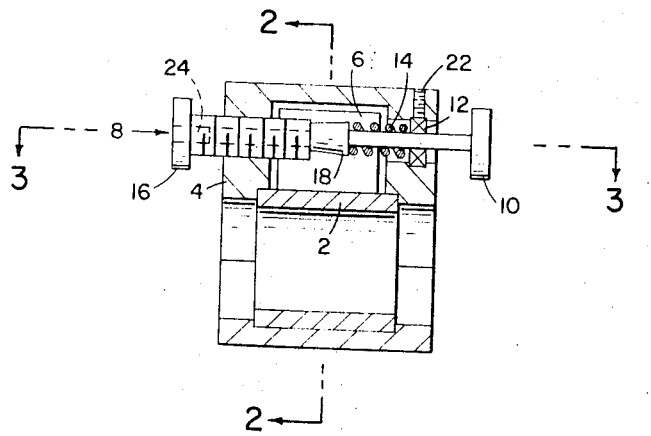
FIG. I
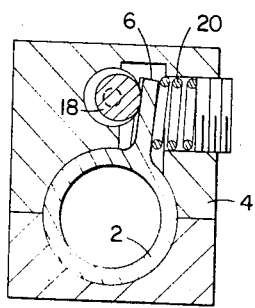
FIG. 2
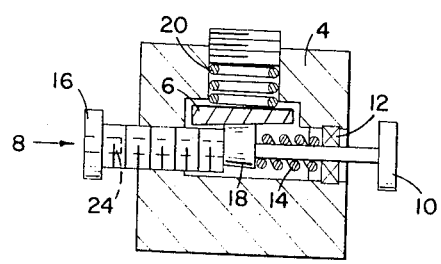
FIG. 3
Keith K. Klatt,
INVENTOR.
BY

United States Patent Office 3,449,970
Patented June 17, 1969

---

3,449,970
FINE AND COARSE ROTATION CONTROL DEVICE
Keith K. Klatt, San Pedro, Calif., assignor, by mesne assignments, to the United States of America as represented by the Secretary of the Navy
Filed July 11, 1967, Ser. No. 652,634
Int. Cl. F16h 27/02, 29/02
U.S. Cl. 74—89
5 Claims

ABSTRACT OF THE DISCLOSURE

A rotary adjustment device having a tapered arm attached to a rotatable member. This arm bears against an eccentric cam. The cam is rotated to achieve coarse adjustment and axially moved to achieve fine adjustment.

BACKGROUND OF THE INVENTION

There is a need for a device that can achieve extremely fine rotary adjustment over a wide range. The prior art offers devices which employ special gearing, special linkages, and micrometers pushing against long lever arms to obtain rotary control. Previous devices have been bulky and intricate, requiring high precision and not possessing the high adpustment ratio needed for extremely accurate rotary adjustment.

SUMMARY OF THE INVENTION

This rotary adjustment means has a rotatably mounted member with an arm attached to the periphery thereof. The arm bears against an eccentric cam and has a surface that is tapered in a direction generally parallel to the axis of rotation of the rotary member. The cam is rotatable and axially moveable. Coarse adjustment of the device is obtained by rotating the cam with resulting rotary movement of the arm. Fine adjustment is accomplished by axial movement of the cam with resulting rotary movement of the arm.

BRIEF DESCRIPTION OF THE DRAWING

FIGURE 1 is a plan view of the invention partly in cross section;
FIGURE 2 is a cross-sectional view of FIGURE 1 taken along section line 2—2; and
FIGURE 3 is a cross-sectional view of FIGURE 1 taken along section line 3—3.

DESCRIPTION OF THE PREFERRED EMBODIMENT

Fine adjustment screw 16 and coarse adjustment shaft 10 are mounted in housing 4 as shown in FIGURE 1.

Barrel 2, shown in FIGURE 2, is rotatably mounted in housing 4 and has an arm 6 attached to the periphery thereof. The arm 6 is tapered in a direction generally parallel to the direction of rotation of the barrel.

Adjustment means 8 of FIGURE 3 comprising coarse alignment shaft 10, bearing 12, bias spring 14, and fine adjustment screw 16 is mounted in housing 4 relative to the arm. The coarse adjustment shaft 10 has a machined portion thereof which is eccentric cam 18. Eccentric cam 18 and arm 6 are fit-tapered, that is, the eccentric cam and the arm are tapered so that their surfaces fit smoothly together. The eccentric cam is biased on a first side by spring 14 and on a second side by fine adjustment screw 16 which threads into the housing. The arm is biased against the adjustment means by spring 20.

Coarse adjustment shaft 10 is slideably mounted in bearing 12. The bearing is mounted in the housing so that it may rotate or be locked in position by locking screw 22 (FIGURE 3). The coarse adjustment shaft is keyed with the bearing so that it may not rotate with respect to the bearing, but that it may axially move therethrough. A portion 24 of coarse adjustment shaft 10 is round. This portion inserts axially into a round machined opening which extends the length of the fine adjustment screw and, thus the axes of the coarse adjustment shaft and the fine adjustment screw are coincident. The coarse adjustment shaft is free to rotate or move axially within the fine alignment screw.

OPERATION

Coarse adjustment is achieved by rotating the coarse adjustment shaft 10. After coarse adjustment has been achieved, the bearing 12 is locked to the housing 4 to prevent the coarse adjustment shaft from further rotation. Rotation of the coarse adjustment shaft and thus the eccentric cam 18 causes the spring biased arm 6 to vary in position. Its position and the archial movement of barrel 2 is determined by the rotary position of the eccentric cam. Fine adjustment is achieved by screwing the fine adjustment screw 16 into the housing 4. Screwing the fine alignment screw forces the eccentric cam 18 along the tapered surface of arm 6. This axial movement of eccentric cam 18 results in a very high adjustment ratio. This invention allows an unlimited selection of adjustment ratios. The designer has only to vary the pitch of the threads on the fine adjustment screw and the slope on the arm to obtain whatever ratio he desires.

While a specific embodiment has been described in detail, it is obvious that numerous changes may be made without departing from the general principles and scope of the invention. Accordingly, the scope of this invention is to be limited only by the appended claims.

What is claimed is:

1. A rotary adjustment means comprising: a housing having a rotatably mounted member having an arm attached to the periphery thereof and an adjustment means mounted adjacent said arm having an eccentric cam rotatable and axially moveable relative to and in contact with said arm for imparting motion to the arm and thereby rotation to said rotatable member.

2. A rotary adjustment means as set forth in claim 1 wherein said rotatably mounted member and said adjustment means are mounted in a housing, and wherein said adjustment means further includes a coarse adjustment shaft with said eccentric cam mounted on said shaft, a first end of said shaft mounted for axial movement through a bearing, said bearing being rotatably mounted in said housing and said housing having a locking screw threadably mounted therein for frictionally locking said bearing to said housing.

3. A rotary adjustment means as set forth in claim 2 wherein said adjustment means further includes a fine adjustment screw and a first spring, a second end of said shaft being rotatably mounted and axially slideably within said fine adjustment screw; said spring biasing said cam into engagement with said fine adjustment screw.

4. A rotary adjustment means as set forth in claim 3 where in the surfaces of said arm and said eccentric cam have axial and rotary coaction therebetween and have a correlated taper in a direction generally parallel to the axis of rotation.

5. A rotary adjustment means as set forth in claim 4 to further comprise a second spring, said second spring being mounted in said housing biasing said arm against said cam.

References Cited

UNITED STATES PATENTS

| | | | |
|---|---|---|---|
| 678,409 | 7/1901 | Lengweiler | 74—54 |
| 1,720,189 | 7/1929 | Jackson | 74—568 |
| 2,621,495 | 12/1952 | Garbarini | 74—568 |
| 3,124,009 | 3/1964 | Groover. | |
| 3,204,208 | 8/1965 | Lyman et al. | 74—89.15 |
| 2,556,304 | 6/1951 | Velkas et al. | 74—89 |

OTHER REFERENCES

Reid et al., Product Engineering, September 1949, pp. 119 and 120.

FRED C. MATTERN, JR., *Primary Examiner.*

W. S. RATLIFF, JR., *Assistant Examiner.*